United States Patent
Leitgeb et al.

(10) Patent No.: US 6,507,645 B1
(45) Date of Patent: Jan. 14, 2003

(54) METHOD FOR CHANGING SERVICE DATA

(75) Inventors: Manfred Leitgeb, Gramatneusiedl; Jörg Swetina, Vienna, both of (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/658,716

(22) Filed: Sep. 11, 2000

(30) Foreign Application Priority Data

Sep. 9, 1999 (DE) .......................................... 199 43 144

(51) Int. Cl.$^7$ ............................. H04M 3/42; H04M 3/00
(52) U.S. Cl. ......................... 379/201.12; 379/201.02; 379/201.03; 455/419
(58) Field of Search ................. 379/142.05, 201.02, 379/201.03, 207.11, 207.13, 221.08; 455/418, 419

(56) References Cited

U.S. PATENT DOCUMENTS 5,958,016 A * 9/1999 Chang et al. ............... 709/229
5,978,672 A * 11/1999 Hartmaier et al. .......... 455/413

FOREIGN PATENT DOCUMENTS

| DE | 196 47 109 A1 | 5/1998 |
| DE | 197 17 588 A1 | 12/1998 |

* cited by examiner

*Primary Examiner*—Ahmad F. Matar
*Assistant Examiner*—Hector Agdeppa
(74) *Attorney, Agent, or Firm*—Laurence A. Greenberg; Werner H. Stemer; Ralph E. Locher

(57) ABSTRACT

A method for changing service data includes setting up service data in at least one of subscriber register nodes of a telecommunications network, the service data containing subscription-related data concerning subscribers of the network and the service data to be altered by at least one message of a functional protocol. The at least one message of a functional protocol is sent to the at least one of the subscriber register nodes. A terminal of the network generates a handler message based on a specific command input by a user on the terminal. The handler message is independent of the functional protocol and has identification information concerning a subscriber of the network and change information regarding a nature and scope of a change of the service data of the subscriber. The terminal sends the handler message to a service control point of the network. The service control point uses the handler message to determine the identification information and the change information and, based on the identification information and change information, generates at least one protocol message corresponding to the functional protocol and containing command information for changing the service data. The at least one protocol message is sent to one of the subscriber register nodes or a subscriber register node to which the subscriber is assigned. The subscriber register node receiving the at least one protocol message evaluates the at least one protocol message for initiating the changes specified in the at least one protocol message.

12 Claims, 1 Drawing Sheet

METHOD FOR CHANGING SERVICE DATA

BACKGROUND OF THE INVENTION

Field of the Invention

The invention relates to a method for changing service data that are set up in one or more subscriber register nodes of a telecommunications network, that contain subscription-related data concerning subscribers of the network, and that can be altered by at least one message of a functional protocol, which message is sent to the or to one of the subscriber register nodes.

Telecommunications networks, in particular, telephone networks, are constructed as fixed networks or mobile radio networks. Such networks have inter-networked switching devices and other network nodes that serve for establishing and maintaining call connections between the subscribers of a network and for controlling and managing these functions and supplementary services realized in the network. In mobile radio networks, respective base stations are connected to the switching devices. With the aid of the switching devices, base station telecommunications terminals can be connected through a radio interface. These terminals enable network access for a subscriber of a mobile network. Furthermore, the switching devices are also set up for the gateway to further networks, e.g., a data transmission network or a fixed network.

One example of a mobile radio network is the prior art Global System for Mobile communications ("GSM") network. The GSM network discloses the principle of realizing memory units in the network nodes within a mobile network, subscriber-specific data concerning the network-specific services being stored in each case in the memory units. One of these memory units is the home location register ("HLR"), which is generally situated at a fixed, defined location and in which the subscription data of the subscriber are stored. The subscription data relate to the registration of the subscriber and also the intelligent services to which the latter has subscribed and the service features assigned thereto. The subscriber identifies him/herself to the mobile network by a specific Subscriber Identity Module ("SIM") identifier stored, for example, in his/her mobile unit or in a SIM card inserted into the terminal that is currently being used.

The signaling between the network nodes is effected with the aid of functional protocols provided for this purpose, depending on the fixed or mobile network under consideration, such as, e.g., the Intelligent Network Application Part ("INAP") protocol, the CAMEL Application Part ("CAP") protocol, or the Mobile Application Part ("MAP") protocol, in accordance with the prior art GSM standards.

In many telecommunications networks, not only the basic services are set up, such as, e.g., the telephone and facsimile service of a telephone network, but also further services are set up. These further services are referred to below as supplementary services. A network subscriber can address the supplementary services if the subscriber has subscribed to them. Supplementary services may be, inter alia, services that supplement the basic services, e.g., call diversion, management-oriented services, e.g., interrogation of the call charges accrued by a subscriber, or application services based on the basic services, e.g., a bank accounting service. In an intelligent network there is often a dedicated network node provided for management and implementation of the services. The network node is referred to as a service control station or Service Control Point ("SCP") or, in particular, in the CAMEL standard for GSM networks, a CAMEL Service Environment ("CSE"). The service control station is generally different from the switching devices of the intelligent network.

Specific service-related data can be changed by the relevant subscriber him/herself. This applies, in particular, to the data concerning the supplementary services to which the subscriber has subscribed. The services are changed, after all, by the subscriber in the course of activating/deactivating a supplementary service, e.g., when setting up a call diversion, the service data specifying the presence of a call diversion and also the associated destination address.

In this regard, service data change is performed by the subscriber by a message exchange in the telecommunications network between the subscriber, through the subscriber's terminal, and the telecommunications network. The messages in the network ultimately are forwarded to the home location register assigned to the subscriber, where they are processed.

During the change of the subscription data, the message exchange is effected with the aid of dedicated user-service signaling. For example, the use of a dual-tone multi-frequency method ("DTMF") interface is known, in which, however, only numbers and a few special characters can be transmitted. In a GSM network, the service of the Unstructured Supplementary Service Data ("USSD") can be used, for example. The use involves special signaling, which can be initiated in phase 2 of the USSD service in both directions between terminal and network service. A further example is the use of message elements of the Intelligent Network Application Part protocol ("INAP"). The protocol was originally designed for network-internal communication between switching centers and a service control station, but can also be used for user-service signaling. The various signaling possibilities can, in principle, be combined with one another.

It is not readily possible for a subscriber to change the service data associated with his/her subscriber connection from a third-party connection, that is to say, a different terminal or a terminal having a third-party SIM identifier. Setting-up of an uncomplicated possibility of this type, which should also allow cross-network messaging, has not been implemented previously because those skilled in the art considered that changes to the programming of the home location registers would be necessary for this purpose. Such changes would have entailed, overall, an unacceptable complexity on the part of the network operators.

SUMMARY OF THE INVENTION

It is accordingly an object of the invention to provide a method for changing service data that overcomes the hereinafore-mentioned disadvantages of the heretofore-known devices and methods of this general type and that demonstrates a way in which the change of service data can be carried out, in particular, for supplementary services from a third-party connection, without the change necessitating intervention in the programming or hardware of the relevant home location register.

With the foregoing and other objects in view, there is provided, in accordance with the invention, a method for changing service data, including: setting up service data in at least one of subscriber register nodes of a telecommunications network, the service data containing subscription-related data concerning subscribers of the network and the service data to be altered by at least one message of a functional protocol; sending the at least one message of a functional protocol to the at least one of the subscriber register nodes; generating with a terminal of the network a handler message, based on a specific command input by a user on the terminal, the handler message being independent of the functional protocol and having identification information concerning a subscriber of the network and change information regarding a nature and scope of a change of the service data of the subscriber; sending the handler message with the terminal to a service control point of the network; using, with the service control point, the handler message to determine the identification information and the change information and, based on the identification information and change information, generating at least one protocol message corresponding to the functional protocol and containing command information for changing the service data, and sending the at least one protocol message to at least one of one of the subscriber register nodes and a subscriber register node to which the subscriber is assigned; and evaluating, with the at least one subscriber register node receiving the at least one protocol message, the at least one protocol message for initiating the changes specified in the at least one protocol message.

Objectives of the invention are achieved by a method of the type mentioned in the introduction in which, according to the invention, based on a specific command input by a user on a terminal of the network, the terminal generates a handler message (independent of the functional protocol) with identification information concerning a subscriber of the network. The handler message also contains change information regarding the nature and scope of the change of service data of the subscriber. The terminal sends the message to a service control point of the telecommunications network. The service control point uses the handler message to determine the identification information and the change information and, based on the information, generates at least one protocol message that corresponds to the functional protocol and contains command information for changing the service data. The service control point sends the message to the subscriber register node or to that subscriber register node to which the subscriber is assigned. The subscriber register node then evaluates the at least one protocol message for initiating the changes specified therein.

The object of the invention is achieved in a simple manner by using the message that originates from the user and that is transmitted in a protocol-independent format and converting the message into a message of the functional protocol on the part of the service control points. At the same time, the realization of the method according to the invention does not require any new network components or protocols.

In a preferred embodiment of the invention, a subscriber identifier that identifies the subscriber or the subscriber's terminal in the network is used as identification information in the handler message. For example, the information is a cross-network subscriber call number. Such configuration allows reliable identification of the destination subscriber regardless of the user's connection or location, in particular, across network boundaries.

It is favorable for the service control points to perform an authorization check with regard to the specified changes. The authorization check can be done, in particular, by taking an authentication identifier from the handler message with the service control point and checking the identifier. Only if the result of the check is positive is at least one protocol message generated. The active authorization of the user can also be checked by having the service control point check the authorization of the user with respect to the change requested in the handler message. Only if the result of the check is positive is at least one protocol message generated.

Furthermore, if necessary for security reasons, the service control point checks in an authorization dialog with the user the authorization of the user with respect to the change of the service data. The aforementioned authorization checks can, of course, also be combined with one another, the generation of the protocol message(s) being continued only if all the checks yield a positive result.

The invention's method for changing service data is suitable, in particular, for being carried out in a telecommunications network that is configured as a mobile radio network, e.g., a GSM network, and in which the subscriber register nodes are realized as home location registers. In such a configuration, a USSD message may expediently be used as the handler message.

The invention may be embodied equally in a telecommunications network that is configured as a fixed network, in particular, an ISDN network.

In accordance with a concomitant mode of the invention, a container message realized in a keypad format is expediently used as the handler message, resulting in the input of characters through a simply configured terminal keypad.

Therefore, service data for subscribers of a telecommunications network are changed by messages of a functional protocol, e.g., of the MAP protocol, the messages being sent to the assigned subscriber register node. A command from a user for changing service data of a subscriber is sent as a handler message of, for example, a keypad protocol to a service control point of the network. The latter sends a message of the functional protocol with command information for changing the service data to the subscriber register node.

Other features that are considered as characteristic for the invention are set forth in the appended claims.

Although the invention is illustrated and described herein as embodied in a method for changing service data, it is, nevertheless, not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
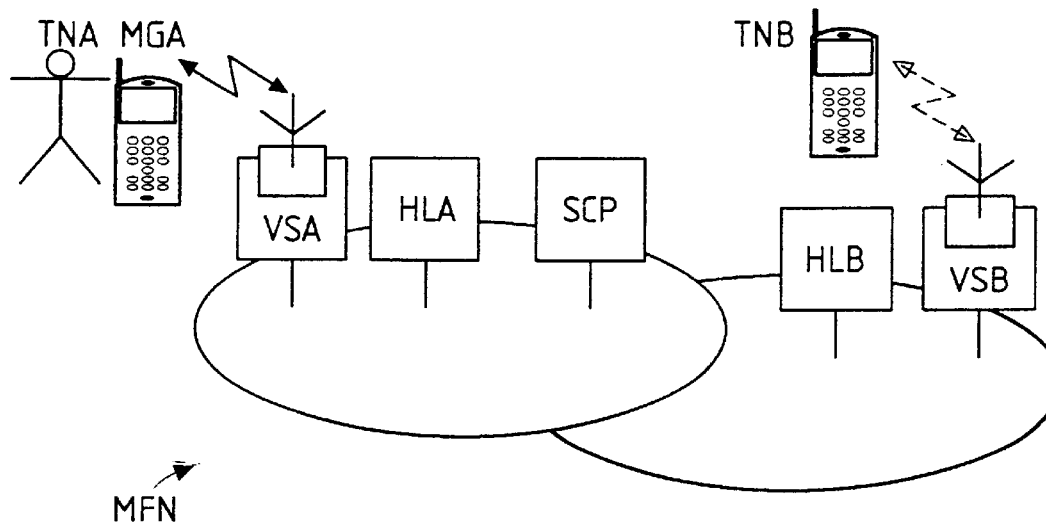
FIG. 1 is an overview block diagram of a mobile radio network and its components, and two subscribers of the network.

In all the figures of the drawing, sub-features and integral parts that correspond to one another bear the same reference symbol in each case.

Referring now to the figures of the drawings in detail and first, particularly to FIG. 1 thereof, there is shown the user TNA and also the mobile terminal MGA, through which the user accesses the GSM network MFN. Also shown is that mobile switching center VSA of the mobile network MFN within whose coverage area the user TNA with his/her mobile unit MGA is situated and which is, therefore, assigned to him/her as a visited mobile switching center ("VMSC"). Furthermore, the radio interface between the mobile unit MGA and a base station of the mobile switching center VSA is illustrated symbolically. As is well known to a person skilled in the art, the mobile switching center VSA holds, in its visitor location register, an entry concerning the user TNA who has registered as a network subscriber and the user's TNA subscriber-specific data. The mobile switching center VSA obtains the user's subscriber-specific data in a conventional manner from the home location register HLA assigned to the user TNA. The same correspondingly applies to a second subscriber TNB for the user's TNA mobile terminal, which is shown in place of the subscriber in FIG. 1, and also the home location register HLB assigned thereto. The subscriber TNB may be registered through a visited mobile switching center VSB in the network MFN. Moreover, it is not significant if the two subscribers TNA, TNB are actually different persons or, for example, these connections are two connections of the same user.

For the implementation of services that are offered to the network subscribers for use, a service control point SCP is set up in the network MFN. The service control point SCP may also be realized as a CSE node according to the CAMEL standard.

The mobile radio network of the exemplary embodiment under consideration is a GSM network in accordance with the aforementioned standards including the CAMEL standard in phase 2; the invention, however, is not restricted to such networks. The mobile radio network MFN may, for example, be realized as a GSM network interconnection in which the subscribers TNA, TNB can move ("roam") between the networks that form the network interconnection; as indicated, for example, in FIG. 1, the two subscribers may, in particular, be located in different networks of the network interconnection.

Figure 2:
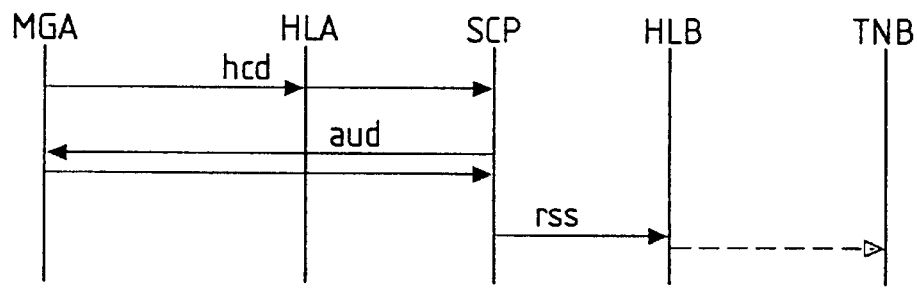
FIG. 2 is a signal timing diagram of messages that are exchanged in the course of a service data change according to the invention.

In an example, the user TNA wishes to effect call diversions of all incoming calls for the subscriber TNB to the mobile unit MGA, which is currently being used by the user TNA. The call diversion is effected by the Call Forwarding Unconditional ("CFU") service in the GSM network under consideration. The message exchange that takes place in the course of the operation for registering the call diversion in the mobile radio network MFN is illustrated in the signal timing diagram in FIG. 2, in which the time axis runs in the vertical direction. In FIG. 2, the relevant important signaling points for comprehension are shown as vertical lines, whereas, in particular, the switching centers VSA, VSB, and the associated base stations are not illustrated because the signaling through them takes place in a conventional manner.

The user TNA inputs on his/her mobile radio transceiver MGA a message that contains the call number, e.g., the MSISDN number, of the destination subscriber TNB and information relating to the desired change of the service data. The message is transmitted as a USSD message HCD from the mobile unit MGA to the network MFN. The USSD command HCD serves as the handler message in the sense of the invention. In the network MFN, the USSD command HCD is directed in a conventional way to the home location register HLA, which is assigned to the mobile unit MGA, and from there to the service control point SCP.

Figure 3:
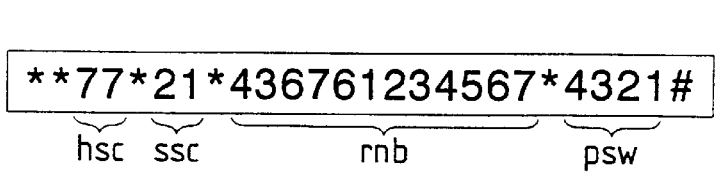
FIG. 3 is a representation of a handler message according to the invention.

The handler message HCD has the form shown in FIG. 3, for example. In the handler message HCD, the two asterisk symbols ("*") located at the beginning of the message HCD identify the registration (setting-up) of a supplementary service. The rest of the asterisk symbols serve as separating characters for the parameters HSC, SSC, RNB, PSW of the handler message, and the hash symbol ("#") concludes the message. The handler message HCD is a container message in which only the start and end of the message and also, if appropriate, separating characters are subject to a fixed format. Whereas the rest of the content of the container message can be chosen freely for the purposes of the information exchanged—in contrast to signaling messages of the signaling protocols, for example, in which the structure and content of the messages are controlled in a detailed way by functional protocols such as the MAP protocol. The characters used in the container message expediently belong to a keypad format, resulting in the ability to input the characters through a simply constructed keypad of a terminal. A further advantage of the keypad format is that, due to its simplicity, transparent communication of the characters is readily provided. A further advantage emerges from the fact that the mobile unit MGA transmits the handler message HCD as a USSD command in the form of a transaction message, thereby considerably reducing the communication and signaling complexity in comparison with a call connection.

The first parameter HSC of the handler message HCD is a service code that, on one hand, indicates to the home location register HLA that the handler message HCD sent to it is to be forwarded to the service control point SCP, and, on the other hand, represents, for the service control point SCP, an identifier of the message as handler message for changing service data according to the invention. Based on the identifier, for example, a specially provided (for this purpose) handler service of the service control point SCP can be called up, which carries out the following method steps executed on the part of the service control point.

The sequence, format, and content of the parameters of the handler message HCD are configured with regard to the handler service set up in the service control point SCP. For example, in FIG. 3, the second parameter SSC is the service code of the supplementary service to be registered; in the example under consideration, the service code SSC is "21" because the numeric code represents the "Call Forward Unconditional" service. In the exemplary embodiment, the service code SSC represents the change information according to the invention; in other cases, the change information may also be, e.g., a plurality of parameters depending on the changes to be carried out and the affected supplementary service(s). It is noted that the term "change" also encompasses, inter alia, the addition or deletion of data.

A further parameter RNB of the handler message HCD serves as identification information concerning the destination subscriber TNB, e.g., in the form of the destination subscriber's call number specified as MSISDN number. The use of the MSISDN number or of a corresponding subscriber call number format is advantageous because, as a cross-network subscriber identifier, it allows unambiguous reference to a subscriber of a telecommunications network.

Furthermore, the message HCD expediently contains an authentication identifier, for example a password PSW, for checking the authorization of the user TNA with regard to the demanded change of the service data of the subscriber TNB.

On the part of the service control point SCP, the handler message HCD is received and evaluated by the handler service. Receiving and evaluation is done, e.g., in accordance with the following steps:

a) The destination address of the relevant home location register HLB is determined from the MSISDN number RNB of the destination subscriber TNB. The determination is performed in a conventional way by "global title translation" using the domestic country code (CC) and the national destination code (NDC), which the MSISDN number includes in addition to the subscriber number in the narrower sense and which unambiguously designates the home location register HLB of the destination subscriber TNB.

b) The service control point SCP checks the authorization of the user TNB with respect to the change of the service data of the subscriber TNB demanded in the handler message. In the simplest case, checking is performed just by verifying whether or not the user has subscribed for use of the handler service (active authorization), and whether or not the authorization relates to the destination subscriber specified (passive authorization). If authorization is not present, the operation is terminated, if appropriate with a corresponding message to the user TNA.

If a password is demanded, the password PSW specified in the handler message HCD is checked for correspondence with a corresponding password entered by the service control point SCP for use of the handler service by the user TNA with regard to the destination subscriber TNB and the service specified in accordance with the service code SSC, namely, in the example, call diversion.

Instead of or in combination with the authorization checks mentioned, the authorization of the user with respect to the change of the service data can also be checked in an authorization dialog AUD, which is conducted with the user by the service control point SCP. Such an authentication dialog AUD is carried out in a conventional way; thus, the dialog is not explained in any greater detail.

c) The home location register HLB whose destination address was determined in step a) initiates a MAP dialog, based on the so-called "MAP Open Service" of the MAP protocol. The IMSI number of the subscriber TNB, which number is likewise necessary as a destination reference for the MAP dialog, may be determined, for example, in accordance with the method employed by the short message service, by a "MAP-Send-Routing-Info-For-SM" dialog in which routing information is interrogated from a home location register by a mobile switching center.

d) In the course of the MAP dialog, the service control point SCP sends a MAP_REGISTER_SS message RSS to the home location register HLB. The protocol message is created by the handler service using the parameters specified in the handler message HCD and has, in particular, the following parameter values:

as the service code ("SS Code"), the service code of the supplementary service to be registered is specified, 21 in the example under consideration (e.g., "Call Forward Unconditional"); and as the forwarding address ("Forwarded-to Number"), the MSISDN number of the subscriber TNB is nominated, the MSISDN number being specified as the subscriber identifier RNB.

As a result, the home location register HLB obtains a message RSS corresponding to a message that would have been transmitted by the subscriber TNB him/herself and forwarded to the home location register HLB, e.g., through the visited mobile switching center VSB. Consequently, the home location register changes the service data in accordance with the protocol message RSS.

If desired, a notification message can be signaled from the home location register hlb to the affected subscriber TNB (illustrated as an interrupted signal arrow in FIG. 2).

We claim:

1. A method for changing service data, which comprises:

setting up service data in at least one subscriber register node of a telecommunications network, the service data containing subscription-related data concerning subscribers of the network and the service data to be altered by at least one message of a functional protocol;

sending the at least one message of a functional protocol to the at least one subscriber register node;

generating, with a terminal of the network, a handler message, based on a specific command input by a user on the terminal, the handler message being independent of the functional protocol and having identification information concerning a subscriber of the network and change information regarding a nature and scope of a change of the service data of the subscriber;

sending the handler message with the terminal to a service control point of the network;

using, with the service control point, the handler message to determine the identification information and the change information and, based on the identification information and change information, generating at least one protocol message corresponding to the functional protocol and containing command information for changing the service data, and sending the at least one protocol message to the at least one subscriber register node and a subscriber register node to which the subscriber is assigned; and evaluating, with the at least one subscriber register node receiving the at least one protocol message, the at least one protocol message for initiating the changes specified in the at least one protocol message.

2. The method according to claim 1, which comprises using a subscriber identifier identifying at least one of the subscriber and the subscriber's terminal in the network as identification information in the handler message.

3. The method according to claim 1, which comprises taking, with the service control point, an authentication identifier from the handler message and checking the authentication identifier, and generating at least one protocol message only if a result of the check is positive.

4. The method according to claim 1, which comprises checking, with the service control point, an authorization of the user with respect to the change requested in the handler message, and generating at least one protocol message only if the result of the check is positive.

5. The method according to claim 1, which comprises checking, with the service control point, an authorization of the user with respect to the change of the service data in an authorization dialog with the user, and generating at least one protocol message only if the result of the check is positive.

6. The method according to claim 1, wherein the telecommunications network is a mobile radio network, and the subscriber register nodes are home location registers.

7. The method according to claim 6, wherein the mobile radio network is a GSM network.

8. The method according to claim 6, which comprises using a USSD message as the handler message.

9. The method according to claim 1, wherein the telecommunications network is a fixed network.

10. The method according to claim 9, wherein the fixed network is an ISDN network.

11. The method according to claim 1, which comprises using a container message realized in a keypad format as the handler message.

12. In a telecommunications network having subscriber register nodes and service control points, a method for changing service data, which comprises:
   setting up service data in at least one subscriber register node, the service data containing subscription-related data concerning subscribers of the network and the service data to be altered by at least one message of a functional protocol;
   sending the at least one message of the functional protocol to the at least one subscriber register node;
   generating, with a terminal of the network, a handler message, based on a specific command input by a user on the terminal, the handler message being independent of the functional protocol and having identification information concerning a subscriber of the network and change information regarding a nature and scope of a change of the service data of the subscriber;
   sending the handler message with the terminal to a service control point of the network;
   using, with the service control point, the handler message to determine the identification information and the change information and, based on the identification information and change information, generating at least one protocol message corresponding to the functional protocol and containing command information for changing the service data, and sending the at least one protocol message to the at least one subscriber register node and a subscriber register node to which the subscriber is assigned; and
   evaluating, with the at least one subscriber register node receiving the at least one protocol message, the at least one protocol message for initiating the changes specified in the at least one protocol message.

* * * * *